United States Patent [19]

Albertini et al.

[11] 3,943,526

[45] Mar. 9, 1976

[54] AUTOMATIC TIMEKEEPING AND ACCOUNTING UNIT

[75] Inventors: Eugene J. Albertini, Hidden Hills; Max Lagomarsino, Canoga Park, both of Calif.

[73] Assignee: Chronometrics, Inc., Los Angeles, Calif.

[22] Filed: Aug. 19, 1974

[21] Appl. No.: 498,639

[52] U.S. Cl. .............. 346/25; 346/33 R; 179/6 E; 235/61 PE; 235/61 PJ; 360/4
[51] Int. Cl.² .......................................... G01D 3/10
[58] Field of Search .............. 346/33 R, 25; 360/4; 235/61 PE, 61 PJ, 151.1, 151.11; 340/172.5; 179/7.1 R, 2 TC, 6 E; 58/145 K, 152 T

[56] References Cited
UNITED STATES PATENTS

| | | | |
|---|---|---|---|
| 3,632,989 | 1/1972 | Kasischke | 235/151.11 |
| 3,648,243 | 3/1972 | Wiggins | 235/151.1 |
| 3,725,947 | 4/1973 | Albertini et al. | 346/33 R |
| 3,808,372 | 4/1974 | Sielsch | 179/6 E |

*Primary Examiner*—George H. Miller, Jr.
*Assistant Examiner*—Stanley J. Witkowski
*Attorney, Agent, or Firm*—Keith D. Beecher

[57] ABSTRACT

An automatic timekeeping and accounting unit is provided which has particular utility for use by professional persons such as lawyers, accountants, and the like. The unit of the invention keeps track of the person's working activities during the day, and it also serves to record the time and subject matter of interrupting telephone calls, if the user so desires, along with information relating to other work activities. The unit to be described also includes a simple switch which converts the unit into an electronic calculator for performing additions, divisions, subtractions, multiplications, and other calculations, similar to the commercially available solid state pocket calculators, without affecting its timing capabilities.

4 Claims, 2 Drawing Figures

AUTOMATIC TIMEKEEPING AND ACCOUNTING UNIT

BACKGROUND OF THE INVENTION

U.S. Pat. No. 3,725,947, which issued Apr. 3, 1973, and which is assigned to the present assignee, described and claims an automatic timekeeping and accounting timekeeping and accounting unit which functions automatically to record a client/case identifying number, a work activity code number, and the time spent at the particular work, as well as other appropriate data. The unit described in the patent also includes a mechanism which responds automatically to interrupting telephone calls, to permit data respecting such calls also to be recorded.

The unit of Co-Pending application Ser. No. 454,811, which was filed Mar. 26, 1974, and which also is assigned to the present assignee, is similar in some respects to the unit described in the prior patent. However, the unit of the co-pending application does not require any special connection or coupling to the telephone lines, in order to maintain a record of the time and subject matter of the interrupting telephone calls. Instead, the unit described in the co-pending application includes a manually operated pushbutton switch, which is operated by the person using the unit, whenever it is desired to keep a record of the subject matter and time spent on an interrupting telephone call.

The unit of the present invention is similar to the units described above, and it includes a simple switch which, when initiated, permits the timekeeping unit to continue timing, but also to transform the timekeeping unit into an electronic calculator.

The principal purpose of the unit of the present invention, and of the unit described in the prior patent and co-pending application, is to relieve the practicing professional lawyer, accountant, architect, or the like, of the task of maintaining time records for billing purposes of the various clients which he services, and of subsequently assimilating and processing the time records and transferring the information from the time records to separate billing statements to be sent to the clients.

In the use of the unit to be described herein, and of the units described in the patent and co-pending application, the user, upon the start of any work activity, merely presses appropriate pushbutton switches so that data identifying the client and the work activity performed on his particular behalf may be recorded. The user then pushes a "start" pushbutton switch which starts the time recorder and, upon the completion of the work, he pushes an "end" pushbutton switch which stops the time recorder and causes the time spent on the particular activity to be recorded.

The unit described in the patent is constructed so that the telephone call will automatically stop the recording time on the work activity interrupted by the call, and cause the interrupted work to be charged out, and the telephone call activity code and time to be recorded. Then, all the user need do if a charge is to be made, is to enter a code number identifying the client to whom the telephone conference is to be charged. The identifying data of the interrupted work activity is stored in a memory in the unit during the telephone call, and upon completion of the call, the interrupted work activity automatically continues to be recorded.

The operation of the unit to be described herein is similar to the operation of the unit of the co-pending application in that the recording of a telephone call is initiated by a pushbutton switch which is actuated by the user, so that the need to couple or connect the unit of the invention directly to the telephone line is obviated, and so that selected telephone calls only are recorded. In the unit of the present invention, and as mentioned above, another pushbutton switch may be initiated by the user to convert the unit into an electronic calculator, without affecting in any way its timing capabilities.

DETAILED DESCRIPTION OF THE ILLUSTRATED EMBODIMENT

Figure 1:
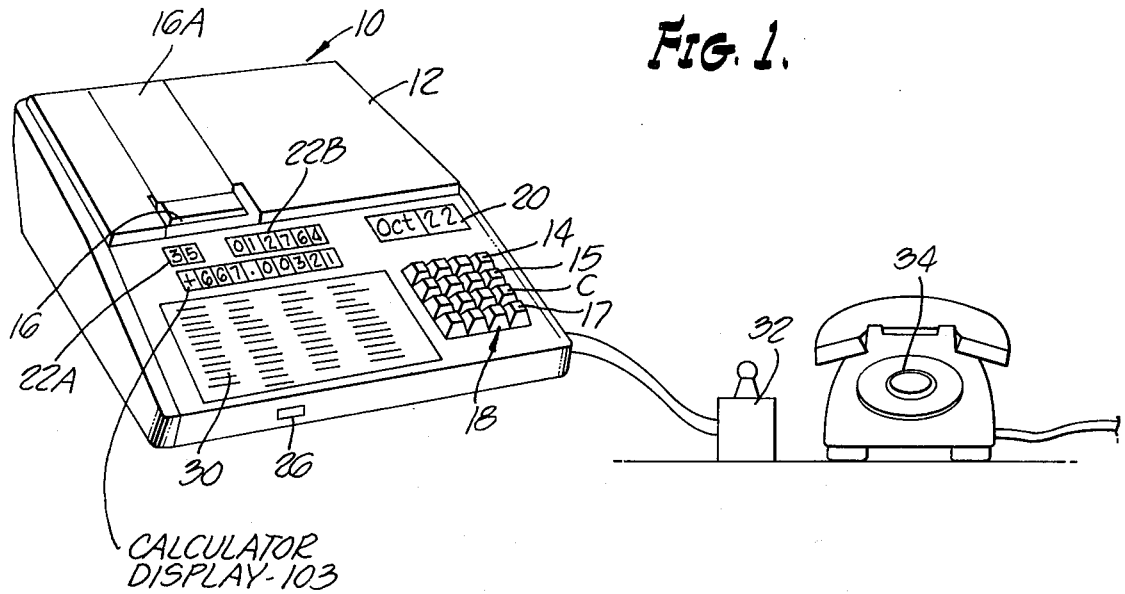
FIG. 1 is a perspective view of an automatic timekeeping and accounting unit which is constructed in accordance with one embodiment of the invention.
Figure 2:
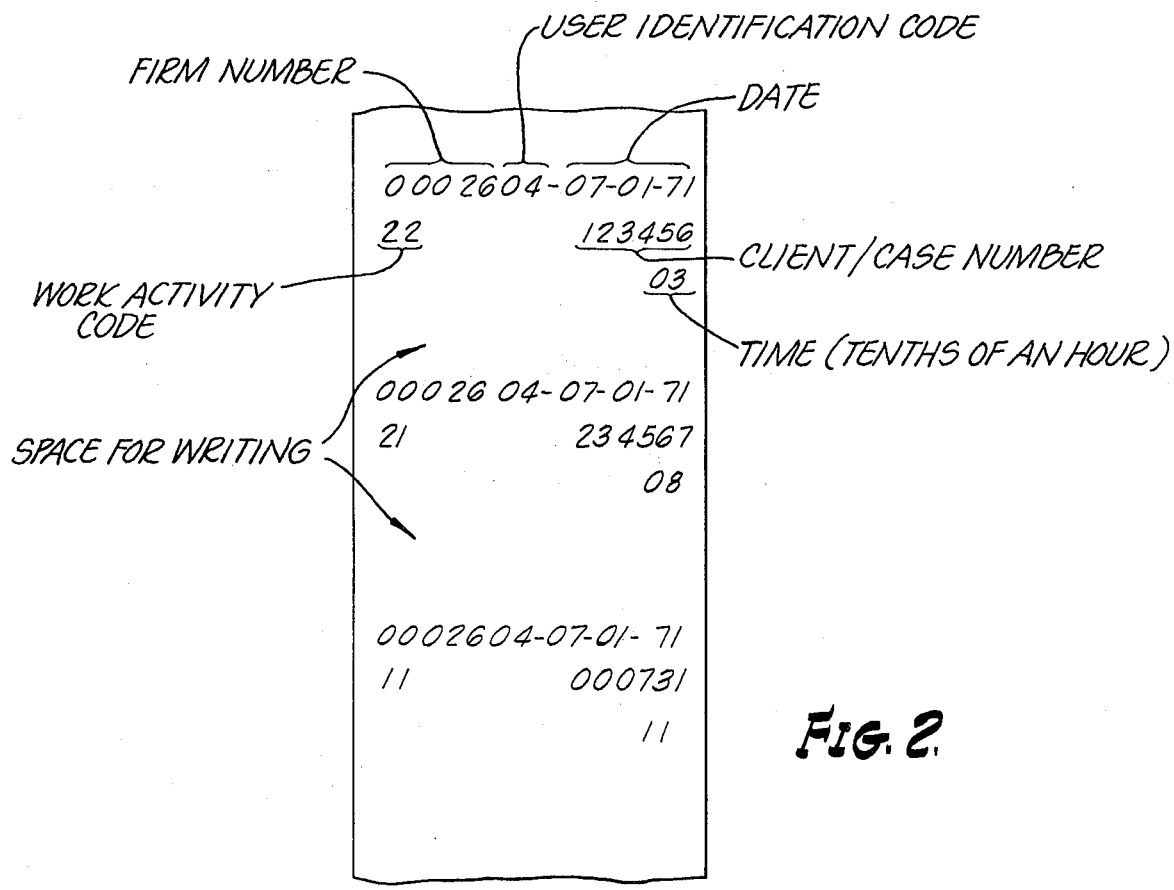
FIG. 2 is a fragment of a paper tape which is used in the unit of FIG. 1, and which shows the manner in which data may be recorded on the tape.

The timekeeping unit shown in FIG. 1 is designated generally as 10, and it is equipped with a cover 12 which may be opened to reveal the internal mechanism and operating components of the unit. The unit 10 includes a paper tape printing mechanism 16 which incorporates a paper tape 16a. The paper tape 16a is mounted on an appropriate tape transport directly over the top of the cover 12, as shown in FIG. 1. As the timekeeping unit is operated, the paper tape printing mechanism 16 operates to draw the paper tape 16a across the top of the cover 12, and to print appropriate data in columnar form on the tape, as shown in FIG. 2. The paper tape is exposed so that additional information may be written directly on the tape by the user, if he so desires.

The unit 10 includes a numeric keyboard 18 which is operated so that code numbers identifying the various clients, cases, work activity, and the like, may be fed into the system. The number fed into the system at any particular time is printed on the paper tape 16a, which is observable at the top of the unit, as shown in FIG. 1. The number fed into the system to identify the particular client/case is also observable by means of a display 22b. The unit also includes a display 22a which displays any one of a plurality of designated work activity numbers, which may be fed into the unit by operation of the keyboard 18, and which identifies the particular work activity being performed for any client. An appropriate chart 30 may be fitted directly onto the machine to list a variety of different work activities, and a corresponding code number for each.

In addition, the keyboard 18 includes a "start" pushbutton switch 14, an "end" pushbutton switch 15, an "advance paper" pushbutton switch 17, and a "C" pushbutton switch. When the "C" pushbutton is depressed, the unit is converted into an electronic calculator of the usual solid state pocket type such as presently marketed by Newlett/Packard as their Model HP-21; Texas Instruments as their Models SR-50, SR-51; Novus as their Model 828; Sprry-Remington as their Models 821GT, 833 GT; and by other national corporations, so that the keyboard 18 may operate the calculator to add, subtract, multiply or divide in conjunction with a usual calculator display 103.

An "on-off" switch 26 for the circuitry in the unit is also provided. A set of thumbwheel switches 20 are positioned on the face of the unit for setting the particular date on which the unit is being operated into the system.

As shown in FIG. 2, the information printed on the paper tape 16a is columnar in nature and it includes, for example, a six digit client/case number (which is also displayed on the display 22b), of which the first four digits may identify the client, and the fifth digit may identify the client's case number, whereas the sixth digit may be a check digit. Also recorded is the work activity code number of two digits, which is also displayed by the display 22a. In addition, the elapsed time number of two digits is recorded in tenths of an hour.

The foregoing data represents an operational transaction, and each operational transaction is preceded by a five digit number representing the firm using the equipment; a two digit number representing the individual user; and a six digit number representing the date. The numbers representing the firm and the individual user may both be wired into the system, whereas the number representing the data may be set up by the thumbwheel switches 20.

The pushbutton entry keyboard 18 is constructed for the pushbutton entry of digits 0–9, and it also contains the "start" pushbutton switch 14, and the "end" pushbutton switch 15, as mentioned above. The keyboard 18 also controls the entry of a number of distinct work activities in the form of the two digit code, as determined from the chart 30, and which are displayed by the display 22a.

The "on-off" switch 26 controls the power to the unit. The "start" switch 14, when activated, starts the timing mechanism in the unit, and causes the transaction identifying data to be printed on the paper tape 16a. The "end" switch 15, when actuated, causes the elapsed time to be printed, stops the timer mechanism, and advance the columnar paper printing mechanism 16. The "advance" pushbutton switch 17, when actuated, provides a control whereby the paper 16a may be advanced at any time.

To activate the unit 10 of FIG. 1 for normal operation, the user first operates the "on-off" switch 26 to turn on the unit, and he then operates the keyboard 18 to set up the particular two digit work activity code on the display 22a, corresponding to the work on which he is engaged. He then operates the keyboard 18 to set up the proper six digit client/case account number which is displayed on the display 22b. The operator then actuates the "start" pushbutton switch 14, and the machine records the aforesaid work activity and client/case data, as well as the firm and user identifying data, and the date, all of which is shown in FIG. 2. At the end of the particular activity, the user then actuates the "end" pushbutton switch 15, and the time spent on the particular work activity for the particular client is then recorded. The unit is then ready for the next work activity to be identified and timed.

At any time, when the operator wishes to use the unit as an electronic calculator, he merely actuates the pushbutton switch "C", and operates the keyboard 18 in conjunction with the display 103.

A telephone interrupt pushbutton switch 32 is positioned adjacent to the telephone 34, and is connected to the unit 10. When switch 32 is operated, the unit 10 is caused to stop, and the data identifying the interrupted work activity is stored in a memory in the unit. Then, the unit operates to identify the telephone interruption by a particular identification code, and to record the time spent on the telephone conference.

If the user wishes to record the interrupting telephone conference for billing purposes, he also sets up the client's identifying number through the keyboard 18, and he actuates the "end" pushbutton switch 15 at the end of the telephone conference, so that a record may be made of the time spent with the particular client on the telephone. Then, the unit will automatically print the interrupted work activity data back onto the paper tape 16a, and again will begin keeping time with respect to the interrupted work activity. The use of the pushbutton switch 32, as explained above, permits the unit to be controlled for selected incoming telephone calls, at the option of the operator, without requiring any direct connection or coupling to the telephone line.

Any error may be corrected directly on the paper tape 16a by the use of pen or pencil and, as shown in FIG. 2, a space may be provided between each separate work activity, to permit the operator to enter further notes and information on the paper tape, if he so desires.

Figure 3:
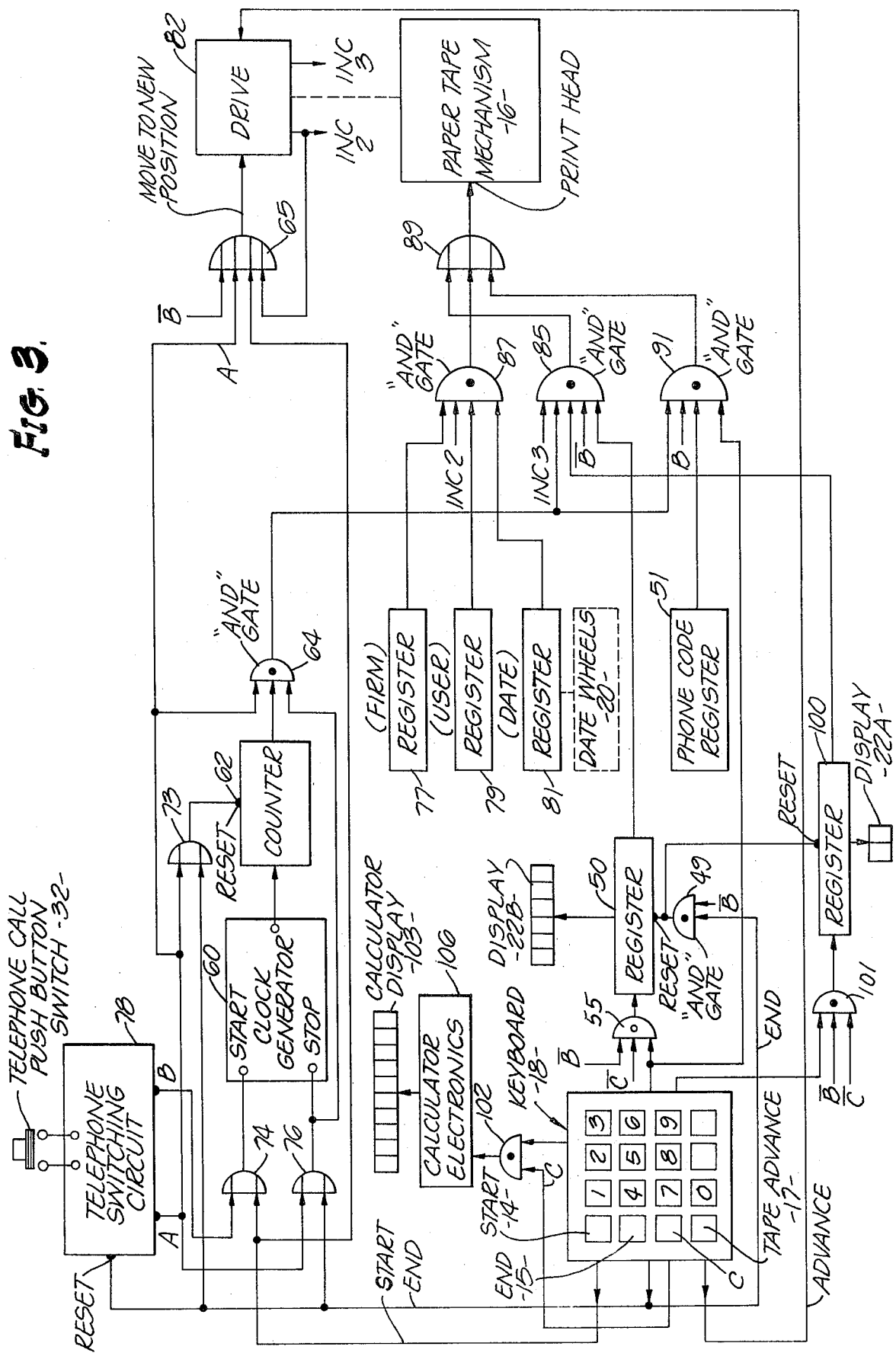
FIG. 3 is a logic block diagram illustrating appropriate electronic circuitry and components which may be incorporated into the unit of FIG. 1.

As shown in the block diagram of FIG. 3, the keyboard 18 associated with the unit 10 of FIG. 1 feeds its information through an "and" gate 55 into a register 50, so that any number set up on the keyboard to identify a particular client and case is loaded into the register 50, and appears on the display 22b which is coupled to the register. The coding used in the register 50 may be a binary code, or other appropriate coding techniques may be used. The output of the register 50 is fed to an "and" gate 85, and through a subsequent "or" gate 89 to the print head of the paper tape mechanism 16.

The various logic components shown in FIG. 3, including the illustrated register, "and " gates, "or" gates, and the like are well known to the art, and need not be described in detail. Moreover, any appropriate paper tape mechanism 16 and associated drive may be used, so that these components, likewise, need not be shown or described in detail, insofar as a clear understanding of the concept of the present invention is concerned.

The electronic system of FIG. 3 also includes an appropriate clock generator 60 which generates clock pulses, when activated. The "start" pushbutton switch 14 is connected through an "or" gate 74 to the "start" input of the clock generator 60, so that whenever the "start" pushbutton switch 14 is actuated, the clock generator 60 begins to generate clock pulses. The "end" pushbutton switch 15 is connected through an "or" gate 76 to the "stop" input of the clock generator 60, so that whenever the "end" pushbutton 15 is actuated, the clock generator 60 is de-activated.

When activated, the clock generator 60 generates a series of regularly spaced clock pulses, and these clock pulses are applied to a pulse counter 62. The pulse counter 62 proceeds from one count to the next so long as the clock generator 60 is activated to generate the clock pulses.

The clock pulses from the clock generator 60 are applied to an "and" gate 64 which, in turn, is connected to "and" gates 85 and 91. The "end" pushbutton switch 15 is also connected to the "and" gate 64 through the "or" gate 76. The "start" push-button switch 14 is connected through an "or" gate 65 to a drive 82 for the paper tape mechanism 16. Whenever the "start" push-button switch 14 is actuated, the drive 82 is caused to move the paper tape mechanism 16 from one position to the next, so that the paper tape mechanism may be ready for a new set of data. The "advance" pushbutton switch 17 is also connected to the drive 82, so that whenever the pushbutton switch 17 is actuated the drive 82 may cause the paper tape mechanism 16 to move to the next position.

The keyboard 18 may also be operated to supply the two digit work activity code through an "and" gate 101 to a register 100, the register being connected to the "and" gate 85. The display 22a is also connected to the register 100. In this way, whenever the keyboard 18 is operated to set up the work activity code, the code is stored in the register 100 and applied thereby to the "and" gate 85 and to the display 22a. A further register 77 is provided, and the firm identifying number is wired into register 77 by any appropriate means. A register 79 is also provided in which the user identifying number is wired in by any appropriate means. A register 81 is provided in which the date identifying number is set by appropriate adjustment of the thumbwheel switches 20. All of these registers are connected to an "and" gate 87.

When the drive 82 drives the paper tape mechanism 16 to a new position by actuating the "start" pushbutton switch 14, the drive generates a signal INC2 which enables the "and" gate 87 so that the information in the three registers 77, 79 and 81 may be printed on the paper tape. The INC2 signal is also supplied to drive 82 through the "or" gate 65, so that the paper tape may be automatically moved by the mechanism 16 to its next position.

The drive 82 then generates a signal INC3 which enables the "and" gate 85, and which permits during normal operation of the system, the client/case data from register 50, and the work activity data from register 100 to be printed on the paper tape. When the "end" pushbutton switch 15 is actuated, the "and" gate 64 is enabled so that the time information may also be printed through the "and" gate 85 and through the "or" gate 89.

The keyboard 18 is connected through an "and" gate 102 to usual calculator electronics of the type incorporated in the present day commercially available solid state pocket or desk calculators, represented by clock 106, which, in turn, is connected to the display 103. Whenever the pushbutton switch "C" on the keyboard 18 is actuated, the "and" gate 102 is enabled, so that the keyboard may operate the calculator electronics 106. This enables the user to perform additions, subtractions, multiplications, divisions, and the like, as with the usual commercial pocket or desk electronic solid state calculator. At the same time, both the "and" gates 55 and 101 are disabled by the $\overline{C}$ term applied thereto, so that operation of the keyboard will in no way affect the timing and work identifying functions of the system.

A telephone switching circuit 78 is provided which has an output terminal A connected to the "or" gate 76, and which also has an output terminal B connected to the "or" gate 74. The telephone switching circuit 78 is energized whenever the user actuates the telephone call pushbutton switch 32. When that occurs, a signal is first generated at the output terminal A (output A).

The output A first enables the "and" gate 64 so that the previously accummulated time in the counter 62 may be passed through the "and" gate 85 to be printed on the paper tape 16a by the paper tape mechanism 16.

The output A is also applied through the "or" gate 65 to the drive 82, so that the paper tape 16a may be moved to the next position. The output A next passes through the "or" gate 76 to stop the clock generator 60, and it passes through the "or" gate 73 to reset the counter 62.

The output A is then replaced by a signal at the output terminal B of the telephone switching circuit 78 (output B). The output B passes through the "or" gate 74 to start the clock generator 60, which in turn, causes the counter 62 to be activated to count the time elapsed during the telephone conference. During the normal operation of the system, no signal appears at the output terminal B of the telephone switching circuit 78, so that a $\overline{B}$ situation is created. During the $\overline{B}$ condition, the "and" gate 85 is enabled for normal operation of the system, and the "and" gate 91 is disabled.

Therefore, during the $\overline{B}$ condition, and during normal operation of the system, information from the keyboard may be read through the "and" gate 55 into the register 50 from there through the enabled "and" gate 85 and through the "or" gate 80 to the paper tape mechanism. Also, the work activity information set by the keyboard may be passed through the "and" gate 101 to the register 100, and from there through the enabled "and" gate 85 during normal $\overline{B}$ operation, to be printed and recorded. At the end of a particular work activity, and while the system is in its normal mode, the "end" pushbutton switch 15 is depressed to cause the time information to be recorded, as explained above, and this also causes the registers 50 and 100 to be reset by the signal passed through the enabled "and" gate 49. The counter 62 is also reset by the signal passed through the "or" gate 73.

During a telephone conference, however, and for the continuance of the output B from switching circuit 78, the normal operation "and" gate 85 is disabled, and the telephone conference "and" gate 91 is enabled. During this B mode, the telephone code number from register 51 is passed through the "and" gate 91 and through "or" gate 89 to be printed by the paper tape mechanism to indicate that the printed data refers to a telephone conference.

Also, the keyboard 18 may be operated to identify the calling or called telephone party, and this information is supplied directly through the enabled "and" gate 91, and through "or" gate 89 to the print head of the paper tape mechanism 16. Since "and" gates 55 and 101 are now disabled, the new numbers set on the keyboard 18 pertaining to the telephone conference will not disturb the previous numbers entered into the registers 50 and 100 pertaining to the interrupted work.

At the termination of the telephone conference, and when the "end" pushbutton switch 15 is actuated, the "and" gate 64 is again enabled through "or" gate 76 so that the count in the counter 62 may be passed through the "and" gate 91 to the paper tape mechanism, so that the elapsed time of the telephone conference may be recorded. The operation of the "end" pushbutton switch 15 also serves to reset the telephone switching circuit 78, so that the output of the telephone switching circuit changes from B to $\overline{B}$. The $\overline{B}$ output is introduced to the drive 82 through the "or" gate 65 to cause the drive to move the paper tape 16a to the next position.

The interrupted data from the registers 50 and 100 is again recorded as the "and" gate 85 is again enabled.

The invention provides, therefore, an improved timekeeping and accounting machine and system for keeping track of billable time in a professional office, and which also serves conveniently to record billable time with respect to telephone conferences which interrupt normal work activities. The machine may also be switched to an electronic calculator mode, as described above.

It will be appreciated that while a particular embodiment of the invention has been shown and described, modifications may be made. It is intended in the following claims to cover the modifications which come within the spirit and scope of the invention.

What is claimed is:

1. An automatic timekeeping and accounting unit including a manually operated keyboard for establishing indicia representing an account and for establishing indicia representing a work activity; a clock means for establishing the time interval in which a particular work activity occurred; recording means coupled to said keyboard and to said clock means for recording the aforesaid indicia; register means coupled to said keyboard for storing the indicia representing the account and the indicia representing the work activity; electronic calculator and display means for presenting numeric solutions to problems established by manual actuation of the keyboard; and switching means for selectively connecting the keyboard to said electronic calculator and for simultaneously disconnecting the keyboard from said register means.

2. The automatic timekeeping and accounting unit defined in claim 1, and which includes a telephone switching circuit connected to said clock means; and manually operated switching means connected to said telephone switching circuit to activate said switching circuit and cause said switching circuit to stop the clock means when the switching means is actuated to indicate that the telephone is being operated.

3. The automatic timekeeping and accounting unit defined in claim 2, and which includes circuit means for maintaining information concerning the interrupted activity in memory in said unit upon activation of said telephone switching circuit.

4. The automatic timekeeping and accounting unit defined in claim 2, and which includes further control circuitry responsive to the activation of said telephone switching circuit for establishing the time interval of a telephone conversation to be recorded by said recording means.

* * * * *